3,459,561
ADDITION OF ANTIOXIDANTS TO FREEZE-DRIED MEAT
Donald E. Mook, Syracuse, and Patrick L. McRoberts, Camillus, N.Y., assignors to Borden, Inc., New York, N.Y., a corporation of New Jersey
No Drawing. Filed Sept. 13, 1965, Ser. No. 487,035
Int. Cl. A23b 1/14
U.S. Cl. 99—157                                        5 Claims

ABSTRACT OF THE DISCLOSURE

This invention relates to the method of preparing fat-containing freeze-dried meat products which are substantially free from off-odors and oxidative rancidity which comprises spraying an antioxidant onto a freeze-dried meat product.

---

Freeze-dried products and particularly fat containing freeze-dried meat, as for example ham, become excessively rancid on exposure to atmospheric conditions within about 24 hours. Freeze-dried meats should therefore be protected from such exposure in order to protect them from spoilage. Difficulty has heretofore been encountered in affording protection of this kind to freeze-dried products.

The present invention provides a method for treating freeze-dried products and in particular fat containing freeze-dried ham, with a potent antioxidant which effectively prevents the oxidation reaction from proceeding when such products are exposed to atmospheric conditions. Treatment of said products with the antioxidants extends its storage life considerably.

Briefly stated, the present invention comprises fat containing freeze-dried meat sprayed with at least 250 parts of an edible antioxidant for 1 million parts of fat (p.p.m.) which is meant to result in a freeze-dried meat product containing about 200 parts of antioxidant for 1 million parts of fat (p.p.m.). This amount of antioxidant will prevent the meat at room temperature under atmospheric conditions from spoiling for at least 30 days. Also methods hereinafter described for making such products. The invention provides a freeze-dried meat having extended storage life as measured by the development of a rancid odor in the air immediately surrounding the treated freeze-dried meat.

As to materials, the freeze-dried material may be any fat containing meat such as for example, beefsteak, ground meat, fowl, pork and the like and may also include fish. The invention will be described in connection with freshly diced ham.

The antioxidants used in the present invention are of the hydroxy phenyl derivative class. Examples include butylated hydroxyanisole, butylated hydroxytoluene and propyl gallate. The antioxidants may be used separately or in combination and in further combination with chelating agents such as citric acid and salts of ethylene diamine tetra acetic acid. The preferred combination is butylated hydroxyanisole and citric acid.

The process of the present invention is carried out by spraying the antioxidant composition onto freeze-dried meat in an inert atmosphere. Freeze-drying may be by any of the usual techniques as for example in the case of freshly diced ham, said ham is maintained at temperatures below the freezing point of water until the water is in the solid state. A vacuum is then maintained and heat may be applied in order to facilitate sublimation of the ice. The freeze-drying process is continued until the moisture content has reached the desired concentration which is generally in the area of 2% or less. Warm (90–120° F.) freeze-dried ham is placed in a rotating and tumbling inducing apparatus such as for example what is conventionally called a "pill coater." The atmosphere prior to addition of the freeze-dried meat may be purged with an inert gas such as nitrogen or carbon dioxide. An antioxidant composition is then added as by spraying in the form of a fine mist onto the surface of the rotating and tumbling freeze-dried meat. The propellant generally used in the spraying operation is an inert gas, for example nitrogen or carbon dioxide. After treatment with the antioxidant the freeze-dried meat may be packaged in an inert gas (e.g., nitrogen) for use in commerce.

Freeze-dried products are especially sensitive to liquid, and particularly to liquid in bulk. Being essentially anhydrous, and also hydrophylic in the dried state, it is readily appreciated that merely dipping or otherwise coating the antioxidant onto the freeze-dried product by methods whereby bulk liquids are used to coat the product, causes it to absorb liquid. Such "soggy" products are not useful for use and sale in commerce as originally intended.

By spraying the antioxidant composition via an inert atmosphere onto a freeze-dried product which is continually tumbling and rotating, the product is uniformly treated with the desired amount of antioxidant. As applied it does not absorb excessive liquid in local areas which would result in a "soggy" product. It is preferred to introduce the antioxidant composition (liquid) into the tumbling and rotating freeze-dried product at a rate not to exceed about 2 fluid ounces per hour per pound of freeze-dried product. Generally the composition is sprayed at the rate of between about .5 and 1.5 fluid ounces per hour per pound. The amount of inert gas carrier is not critical other than the economic limitation on excessive quantities and ineffective spray techniques with less than minimum amounts.

As to proportions we prefer to use active antioxidant based on the weight of the fat content in the freeze-dried meat and further, the proportion is based upon the storage life required of the treated freeze-dried meat. Contrary to what is generally believed, we have found that a high proportion of antioxidant results in a commercially unacceptable product. When proportions of antioxidants in the range of 600 p.p.m. and greater were added to freeze-dried fat containing products, the typical rancid odor did not develop; however, other off-odor compounds were formed which made the product unacceptable. There is, therefore, a critical range of proportions within which range a commercially acceptable, non-odorous, product can be made. Outside of this range, objectionable odors are present in the product.

In general, about 150–500 parts by weight of antioxidant added, per million parts (p.p.m.) by weight of fat content, results in a usable product. Generally about 300 p.p.m. will give a storage life period in excess of 34 days. The preferred range is 200–300 p.p.m. A chelating agent may be admixed with the antioxidant in proportion in the range of up to 55 parts for 100 parts by weight of antioxidant and preferably 15–25 parts. A preferred antioxidant composition consists essentially of an admixture of 100 parts by weight of butylated hydroxy-anisole, 15–25 parts by weight of citric acid, and propylene glycol in an inert carrier atmosphere of nitrogen or carbon dioxide. Where the storage temperature is in excess of room temperature storage life is decreased for a given amount of active antioxidant agent.

The following Table illustrates the proportions of antioxidant for freeze-dried ham containing about 30% by weight of fat. Samples were stored in air at room temperature and at 100° F. Duplicate samples were kept in hermetically sealed containers in a nitrogen atmosphere at room temperature as reference samples.

TABLE I

| P.p.m. | Antioxidant | Storage life, days until development of rancid odor in air | |
|---|---|---|---|
| | | 65° F. | 100° F. |
| 0 | Control | 1½ | 1 |
| 50 | A [1] | 6 | 5 |
| | S-1 [2] | 6 | 6 |
| 100 | A | 9 | 8 |
| | S-1 | 7 | 6 |
| 300 | A | 40 | 34 |
| | S-1 | 8 | 7 |
| 500 | A | [3] 76 | [3] 76 |
| | S-1 | 8 | 8 |

[1] 5 parts of butylated hydroxyanisole for 1 part of citric acid in a propylene glycol carrier. (A)
[2] 2 parts of propyl gallate for 1 part of citric acid in a propylene glycol carrier. (S-1)
[3] Sample did not develop typical rancid odor after 76 days and test was terminated.

The preferred antioxidant is a combination of butylated hydroxianisole and citric acid in proportions of between about 15 and 25 parts of citric acid for 100 parts of butylated hydroxyanisole. The antioxidant and the chelating agent may then be added to a carrier solution such as for example proylene glycol and sprayed onto the freeze-dried meat, preferably using an inert gas as the carrier.

The invention will be further illustrated by the following examples, proportions here and elsewhere herein being expressly as parts by weight except where stated to the contrary.

Example I

After freshly diced ham (¼" x ¼" x ⅛") has been freeze-dried, antioxidant is added as follows:

A solution was prepared of 40 parts BHA, 8 parts citric acid, and 52 parts propylene glycol. This was diluted to 5% in propylene glycol. A "pill coater," which holds approximately 50–65 pounds of freeze-dried diced ham was used to mix the ham during application of the antioxidant. As the "pill coater" rotated causing the freeze-dried ham to tumble varying amounts of antioxidants were sprayed onto the freeze-dried ham. Spraying was accomplished with a spray gun, using nitrogen as a propellant. The spraying rate varied between 1 and 1.5 fluid ounces per hour per pound of ham'

The following table tabulates the results obtained by varying the amount of antioxidants used.

TABLE II

| Number | BHA treatment based on 25% fat content (p.p.m. BHA) | Amount of 5% solution added to 50 lbs. of ham (g.) | Storage life (days) until development of rancid odor in air | |
|---|---|---|---|---|
| | | | Room temp. | 100° F. |
| 1 | 0 | 0 | 1 | 1 |
| 2 | 100 | 28.3 | 15 | 10 |
| 3 | 200 | 56.5 | 34 | 23 |
| 4 | 300 | 84.8 | [1] 52 | [1] 52 |
| 5 | 400 | 113.0 | [1] 52 | [1] 52 |
| 6 | 500 | 141.3 | [1] 52 | [1] 52 |

[1] Typical rancid odor did not develop after 52 days and test was terminated.

The head-space gas of each sample was checked by a Perkin-Elmer Gas Chromatography Unit. In all the oxidized samples, two definite "peaks" or compounds were present. These same compounds were not present in the unoxidized samples. The results were verified by organoleptic (odor) evaluations. The two "peaks" or compounds, found in the head-space gas of the oxidized freeze-dried ham samples were identified as pentanal and hexanal; the latter being an end product of oxidation of linoleic acid at the double bound. "Oxygen Bomb" tests also showed that the rate of oxygen absorption by the antioxidant-treated freeze-dried ham was notably lower than that of the untreated freeze-dried ham.

It will be understood that it is intended to cover all changes and modifications of the examples of the invention herein chosen for the purpose of illustration which do not constitute departures from the spirit and scope of the invention.

We claim:
1. The method of preparing a fat-containing freeze-dried meat material which is substantially free from off-odors and oxidative rancidity for at least 30 days while stored at room temperature, and is essentially anhydrous, comprising the steps of:
 (1) providing an inert atmosphere about the fat-containing freeze-dried meat material.
 (2) spraying an antioxidant of the hydroxy phenyl derivative class in an inert carrier atmosphere on to fat-containing free-dried meat material at a rate of up to about 2 fluid ounces per hour per pound of said material while said material is being tumbled, the proportion of said antioxidant being in the range of about 150–500 p.p.m. by weight of fat content of said material.
2. The method of claim 1, wherein:
 (1) said material is selected from the group consisting of (a) beef, (b) fowl, (c) pork, (d) fish, and
 (2) said antioxidant is selected from the group consisting of: (a) butylated hydroxyanisole, (b) butylated hydroxytoluene, and (c) propyl gallate.
3. The method of claim 2, wherein:
 (1) said material is pork,
 (2) the proportion of said antioxidant being in the range of about 200–300 p.p.m., and
 (3) a chelating agent in proportion of up to about 55 parts by weight for 100 part by weight of said antioxidant is sprayed on to said material.
4. The method of claim 3, wherein:
 (1) said chelating agent is selected from the group consisting of (a) citric acid, and (b) salts of ethylene diamine tetra acetic acid, and
 (2) the proportion of said chelating agent is about 15–25 parts.
5. The method of preparing a fat-containing freeze-dried pork product which is substantially free from off-odors and oxidative rancidity for at least 30 days while stored at room temperature and is essentially anhydrous, comprising the steps of:
 (1) providing an inert atmosphere about the fat-containing freeze-dried pork product.
 (2) spraying on to fat-containing freeze-dried pork, a fine mist at the rate about .5–1.5 fluid ounces per hour per pound of said pork, consisting essentially of an admixture of:
  (a) 100 parts by weight of butylated hydroxyanisole,
  (b) 15–25 parts by weight of citric acid, and
  (c) propylene glycol, said mist being in an inert carrer atmosphere of nitrogen or carbon dioxide, and the proportion of said butylated hydroxyanisole being in the range of about 200–300 p.p.m. by weight of fat content of said pork.

References Cited

UNITED STATES PATENTS

| 2,631,938 | 3/1953 | Miers et al. | 99—166 |
| 2,980,582 | 4/1961 | Keats | 99—189 X |
| 3,067,043 | 12/1962 | Marsh et al. | 99—208 |
| 3,150,985 | 9/1964 | Buscemi et al. | 99—208 |
| 3,165,416 | 1/1965 | Sleeth et al. | 99—169 |

OTHER REFERENCES

Zimmerman et al., "Handbook of Material Trade Names," 1953 edition, published by Industrial Research Center, Dover, N.H., page 560, article entitled Tenox.

HYMAN LORD, Primary Examiner

U.S. Cl. X.R.

99—107, 111, 158, 169, 194, 195, 208, 209